United States Patent [19]

Senso et al.

[11] Patent Number: 5,287,179
[45] Date of Patent: Feb. 15, 1994

[54] IMAGE DISPLAY SYSTEM

[75] Inventors: Hitoshi Senso; Yoshio Arai; Masao Fukuda, all of Tokyo, Japan

[73] Assignee: Pioneer Electronic Corporation, Tokyo, Japan

[21] Appl. No.: 992,237

[22] Filed: May 31, 1991

Related U.S. Application Data

[63] Continuation of Ser. No. 424,000, Oct. 19, 1989, abandoned.

[30] Foreign Application Priority Data

Feb. 27, 1989 [JP] Japan .................................. 1-43172

[51] Int. Cl.⁵ .............................................. H04N 7/01
[52] U.S. Cl. .................................. 348/445; 348/571; 348/805
[58] Field of Search .................. 358/140, 11, 87, 97, 358/160, 180, 183, 214, 141, 12, 188, 230, 231, 242, 245; H04N 7/01

[56] References Cited

U.S. PATENT DOCUMENTS

| | | | |
|---|---|---|---|
| 4,660,096 | 4/1987 | Arlan et al. | 358/108 |
| 4,668,985 | 5/1987 | Kurashige et al. | 358/134 |
| 4,746,981 | 5/1988 | Wadan et al. | 358/160 |
| 4,800,376 | 1/1989 | Suga et al. | 358/56 |
| 4,999,710 | 3/1991 | Senso et al. | 358/140 |
| 5,029,326 | 7/1991 | Tabata | 358/140 |
| 5,159,450 | 10/1992 | Senso et al. | 358/140 |

FOREIGN PATENT DOCUMENTS 0165882  8/1985  Japan .................................. 358/140

*Primary Examiner*—James J. Groody
*Assistant Examiner*—Michael H. Lee
*Attorney, Agent, or Firm*—Sughrue, Mion, Zinn, Macpeak & Seas

[57] ABSTRACT

An image display system is provided in which an image to be displayed is subdivided into a plurality of images. The plurality of images are displayed on a plurality of display devices. An image is converted to a high definition television signal, and then converted to a plurality of signals compatible with standard television systems. Since the image is subdivided electronically, mismatching between screens is avoided. Further, when the input image to be displayed has an aspect ratio larger or smaller than that of the high definition television system, the displayed image is appropriately shifted, thus eliminating hardware and reducing the system cost.

17 Claims, 6 Drawing Sheets

IMAGE DISPLAY SYSTEM

This is a continuation of application Ser. No. 07/424,000, filed Oct. 19, 1989, now abandoned.

DESCRIPTION OF THE PRIOR ART

The present invention relates to an image display system for displaying an image on a screen, the system being composed of a plurality of display devices. More particularly, the present invention relates to an image display system in which an image is first converted to a video signal of a high definition television system, and is then displayed on a screen constructed from a plurality of current television receivers after further converting the high definition video signals to video signals compatible With current television systems.

FIG. 8 is a block diagram showing an example of the prior art image display system, wherein a film image is divided and displayed on a screen constructed from a plurality of NTSC system receivers.

In FIG. 8, when an image in a 35 mm film fm is to be displayed for example, by the use of a plurality of NTSC system receivers, the image of the 35 mm film fm is subdivided, for example, into a total of nine images, in a three by three matrix as illustrated. The nine images thus subdivided are converted to nine sets of NTSC system signals by a telecine unit, and are recorded in nine recording media after being divided by a recording unit. Next, the subdivided and recorded images are displayed simultaneously by nine reproducing units in a display unit consisting of nine NTSC system receivers.

In the conventional example described above, an image of the film is subdivided into a plurality of images mechanically and optically by the use of a plurality of photoelectric converters. Because of this, mismatching can occur such as overlapping, separation, or the like between the adjacent subdivided images at their boundary portions.

SUMMARY OF THE INVENTION

It is an object of the present invention to prevent mismatching that might arise between images after subdivision by carrying out image subdivision electronically.

The object of the present invention is accomplished by converting an image to be displayed into a high definition television signal. An A/D converter converts the high definition signal, into a digital signal and a scan converter subdivides the scanning line data of the high definition signal, converted by the A/D converter, into 3 vertical and 4 horizontal parts for each frame in order to generate scanning line data of twelve groups for one frame. Next, a D/A converter converts the twelve groups of scanning line data into standard television system video signals, and a recording unit 5 records the twelve groups of standard television system signals in a recording media. The twelve groups of standard television system signals so recorded are simultaneously reproduced in a reproducing unit, and are displayed in a display unit consisting of twelve standard television system receivers.

By performing the subdivisions of the high definition television signals by purely electronic techniques, mismatching that could otherwise occur between screens is prevented.

DETAILED DESCRIPTION OF THE PREFERRED EMBODIMENT

Referring to the screen diagram shown in FIGS. 1-3, the operation of the present invention is described in the following. In the description that follows, "Hi-Vision" will refer to the high definition television system and "NTSC system" will refer to current television systems.

The present invention is for displaying a film image on a plurality of NTSC receivers in which the film image is converted temporarily to a Hi-Vision signal before it is converted to a plurality of NTSC signals.

Figure 1A:
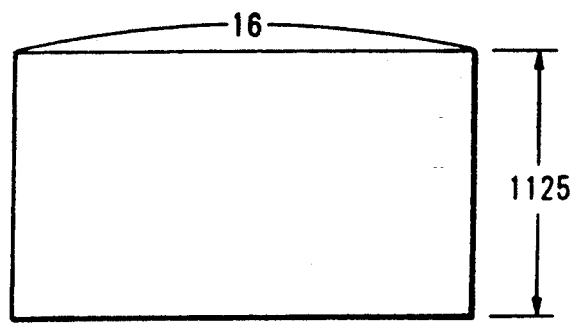
FIGS. 1-3 are screen diagrams for illustrating the operation of the present invention.

The Hi-Vision system, as shown in FIG. 1(a), has an aspect ratio of 16:9 and a horizontal scanning line number for one frame of 1125. The number of effective horizontal scanning lines that appear on the actual screen is 1035.

Figure 1B:
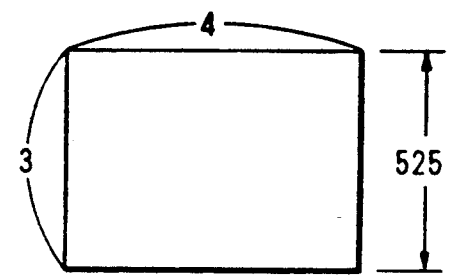

In contrast, the NTSC system, as shown in FIG. 1(b), has an aspect ratio of 4:3 and a number of horizontal scanning lines for one frame of 525, with an effective horizontal scanning line number of 483.

Figure 1C:
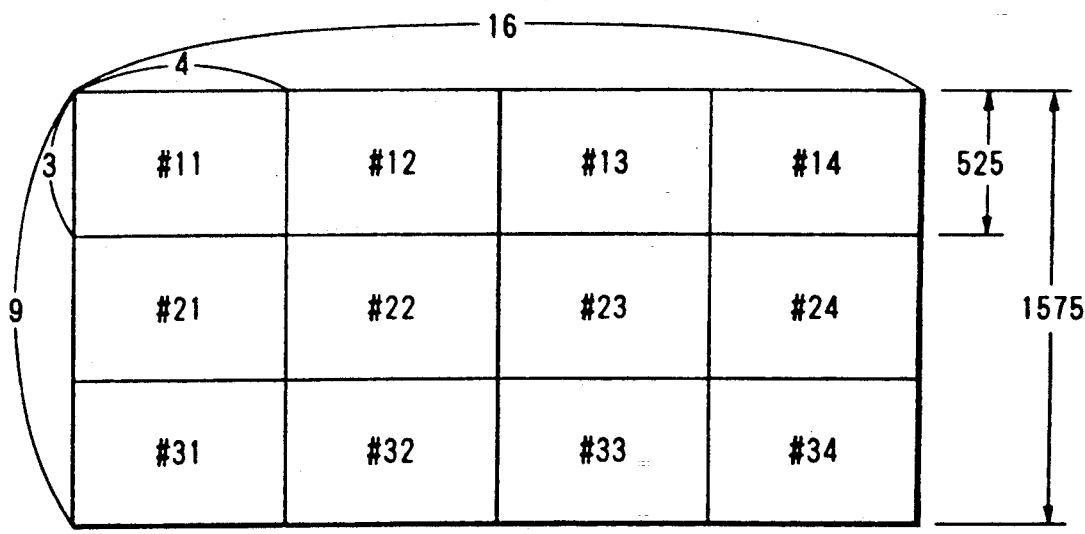

In the present invention, the image of the Hi-Vision system is subdivided into a total of twelve sections by dividing the image into three vertical parts and four horizontal parts as shown in FIG. 1(c). Each of the twelve images thus divided is reproduced by one of the NTSC receivers. The aspect ratio of each image thus divided is 4:3, so that the aspect ratio of the entire image becomes 16:9, coinciding with the aspect ratio of the Hi-Vision system.

In this manner, by electronically dividing an image into a plurality of images, mismatching between images after subdivision can be avoided.

Figures 2A, 2B:
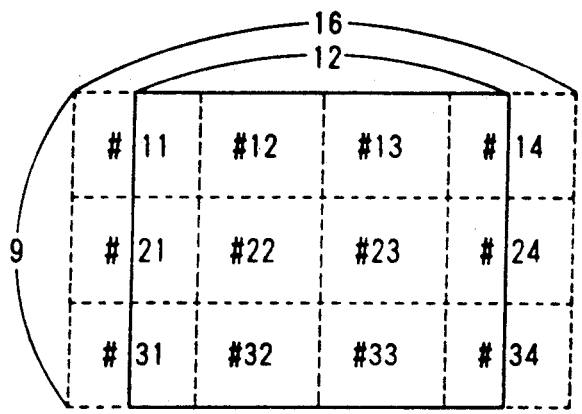
Figures 3A, 3B:
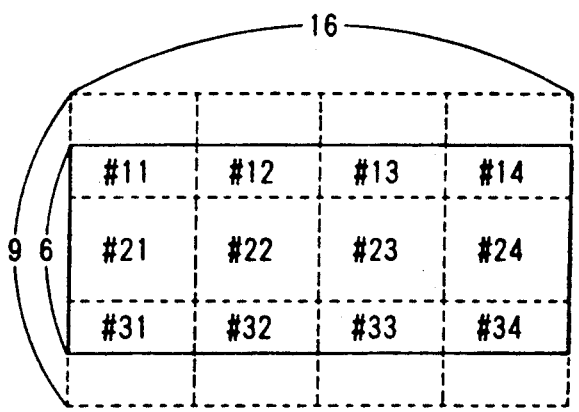

Now, as shown in FIG. 2(a) or FIG. 3(a), when the aspect ratio of an image to be subdivided is smaller or larger than the aspect ratio of the Hi-Vision system, screens will appear with vacant portions at both ends of the horizontal and vertical directions. Although the image could be reproduced through the use of twelve NTSC system receivers, in those receivers that are to cover the left and right end portions or the top and bottom end portions of the entire screen, a picture will actually be displayed on only half of the screen of each receiver. This wastes otherwise available space.

Accordingly, when converting an image with an aspect ratio which is smaller or larger than that of the Hi-Vision system, the image is displayed by shifting its position to the left or to the top of the figure, as indicated in FIG. 2(b) or FIG. 3(b). By so doing, receivers that are located at the right most end or the bottom most end portions of the entire screen can be eliminated, allowing reduction in the cost of the system.

Figure 4:
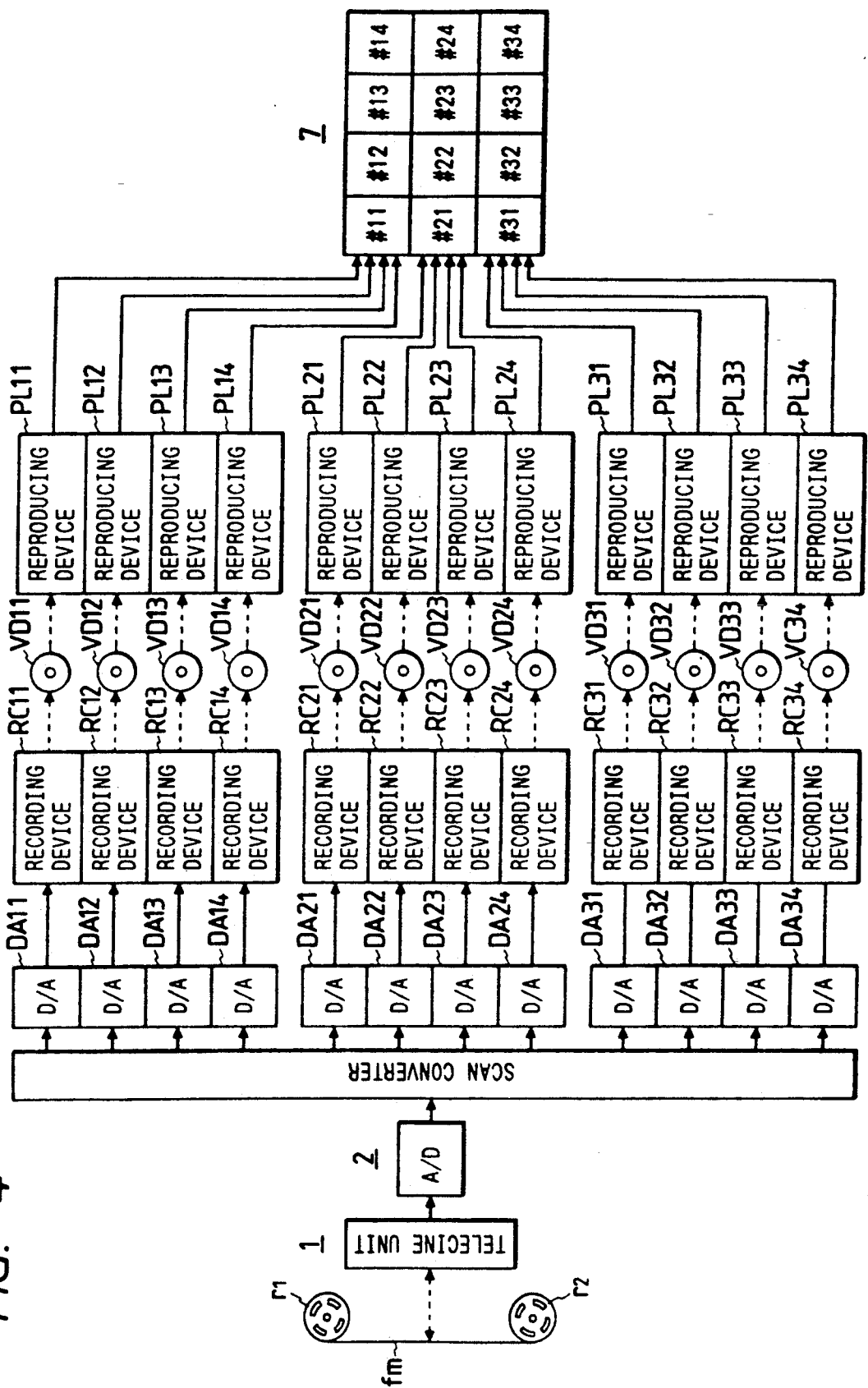
FIG. 4 is a diagram showing an embodiment of the present invention.

FIG. 4 is a block diagram showing an embodiment of the display system in accordance with the present invention.

The embodiment of FIG. 4 converts an image of a 35 mm film fm into a video signal of the Hi-Vision system, and displays the converted video signal on screens composed of a plurality of NTSC system receivers after subdividing the converted video signal further into a plurality of video signals compatible with the NTSC system. The system comprises a telecine unit 1 which converts an image of a 35 mm film fm wound between a feed reel r1 and a take-up reel r2 into a Hi-Vision video signal. Next, an A/D converting unit 2 converts the Hi-Vision signal into a digital signal and a scan converter 3 subdivides the scanning line data of Hi-Vision signal, converted by the A/D converter 2, into three vertical and four horizontal parts for each frame in order to generate scanning line data of twelve groups for one frame. A D/A converting unit 4 consists of D/A converters DA11-DA14, DA21-DA24 and DA31-DA34, which convert the twelve groups of scanning line data into NTSC video signals, and a recording unit 5, which comprises recording devices RC11-RC14, RC21-RC24 and RC31-RC34, records the converted twelve groups of NTSC signals in recording media consisting of twelve video disks VD11-VD14, VD21-VD24 and VD31-VD34. Further, the twelve groups of NTSC signals recorded in the twelve video disks VD11-VD34 in the above manner are simultaneously reproduced in a reproducing unit 6 comprising twelve reproducing devices PL11-PL14, PL21-PL24 and PL31-PL34, and are displayed in a display unit 7 consisting of twelve NTSC system receivers.

Figure 5:
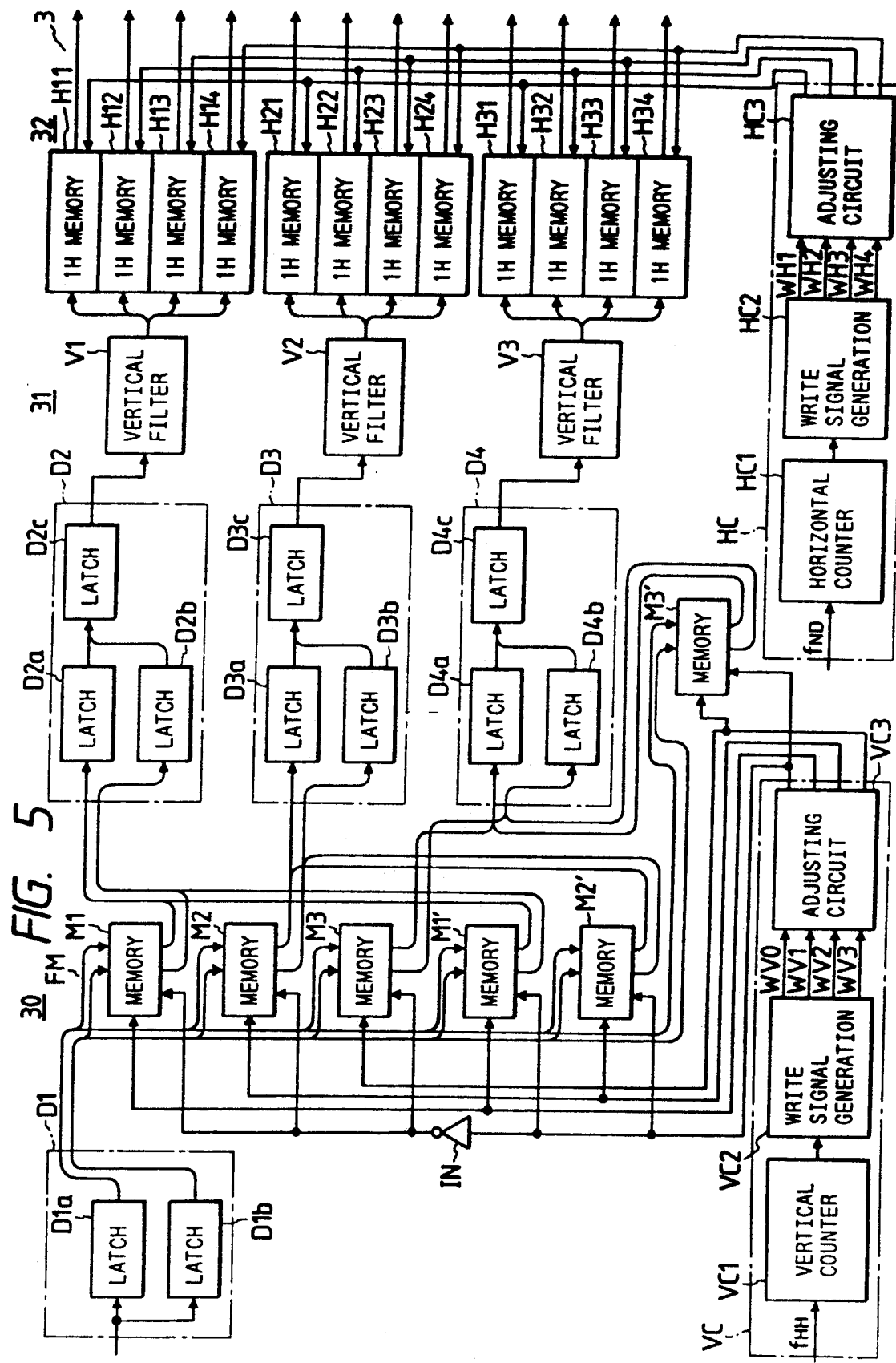
FIG. 5 is a diagram showing the scan converter.

The scan converter 3, shown in FIG. 5, comprises a vertical dividing part 30 which subdivides and stores the Hi-Vision signal, which has been converted to a digital data in the A/D converting unit 2, into three vertical portions for each frame. Further, scanning line converting unit 31 converts five horizontal scanning lines of the Hi-Vision signal to seven horizontal NTSC signal scanning lines, and a horizontal dividing part 32 subdivides each of the converted scanning lines into four horizontal parts.

The vertical dividing part 30 consists of an input latch circuit D1 for latching the Hi-Vision signal, converted to a digital signal in the A/D converting unit 2, and a frame memory FM which subdivides the horizontal scanning line data of the Hi-Vision signal latched in the latch circuit D1 into three vertical parts for each field to be stored in memories M1-M3 and memories M1'-M3'. Vertical dividing part 30 further includes an output latch circuit D2-D4 which consolidates the horizontal scanning line data stored in the frame memory FM for each of the three divided parts, and a vertical control circuit VC which controls the storing operation of the frame memory FM.

The input latch circuit D1 consists of a latch circuit D1a which latches the Hi-Vision signal at the negative edge of a clock signal, and a latch circuit D1b which latches the Hi-Vision signal at the positive edge of the clock signal. The output latch circuits D2-D4 consist of latch circuits D2a-D4a which latch the outputs of the memories M1-M3, latch circuits D2b-D4b which latch the outputs of the memories M1'-M3', and latch circuits D2c-D4c which combine the outputs of both groups of latch circuits D2a-D4a and D2b-D4b, respectively.

The vertical control circuit VC controls assigning horizontal scanning line data that is input in parallel to the memories M1-M3 and M1'-M3'. The vertical control circuit consists of a vertical counter VC1 which counts the horizontal synchronizing signal fHH, a write signal generating circuit VC2 which supplies writable signals WV0-WV3 to the memories M1-M3' based on the output of the vertical counter VC1 and an adjusting circuit VC3 which performs delay control of the writable signals WV0-WV3.

Further, the scanning line converting part 31 performs, for each of the three divided parts, 5-to-7 conversion with respect to the horizontal scanning line data, which has been subdivided in the vertical converting part 30 into three vertical parts, and consists of vertical filters V1-V3, each with identical construction.

Figure 6:
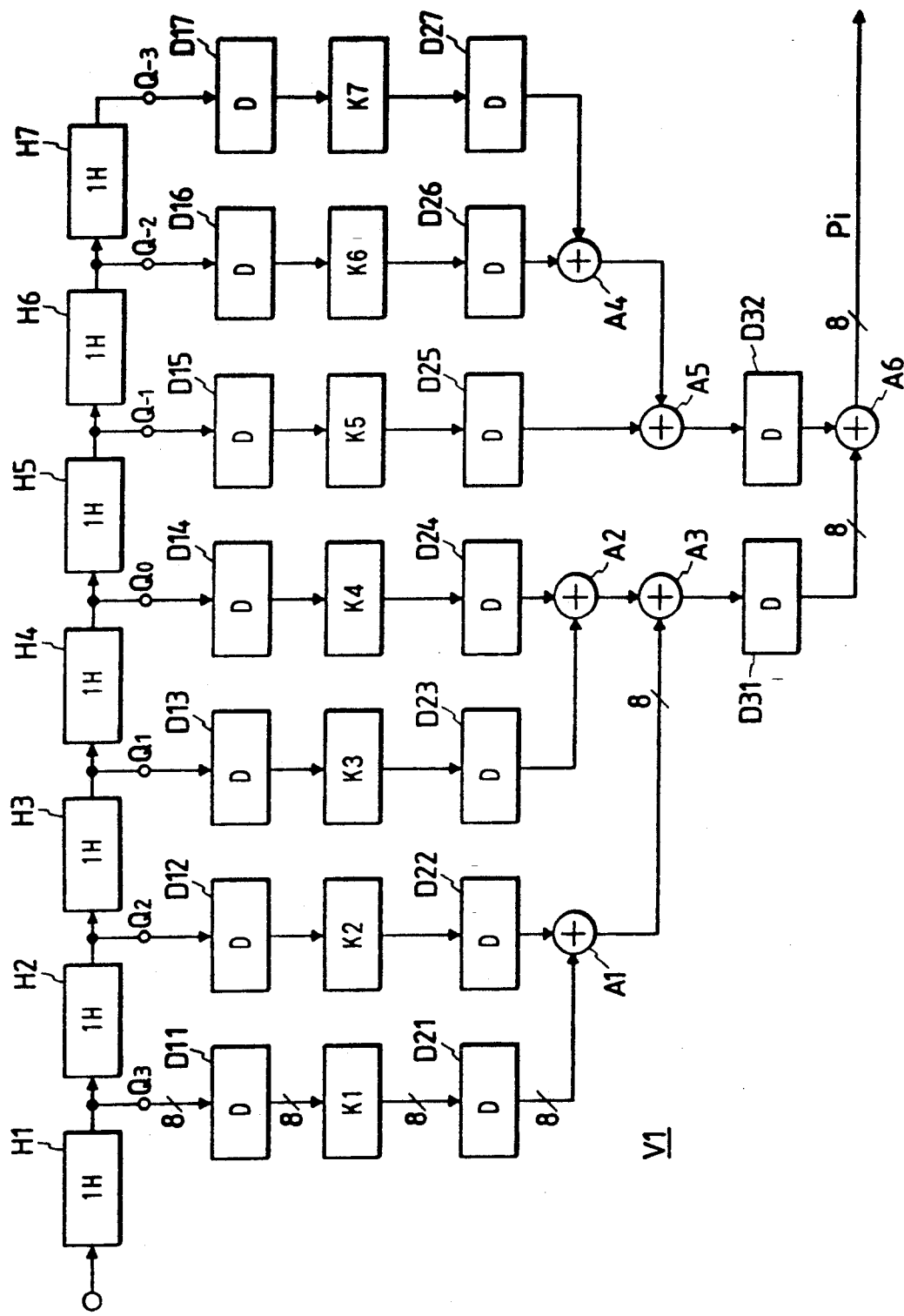
FIG. 6 is a diagram showing the vertical filter.

As shown in FIG. 6, the vertical filter V1 has seven pieces of 1H memories H1-H7 which delay the respectively input data and are connected in series. The outputs of the respective memories H1-H7 are output via latch circuit D11-D17 to coefficient circuits K1-K7 with PROM structures that multiply by predetermined coefficients. The outputs of the coefficient circuits K1-K7 are supplied to latch circuits D21-D27 and the outputs latched onto the latch circuits D21-D24 are summed in adder circuits A1-A3 to be output to a latch circuit D31. The outputs latched onto the latch circuits D25-D27 are summed in adder circuits A4 and A5 to be output to a latch circuit D32. Data latched onto the latch circuits D31 and D32 are finally summed in an adder A6 to be output to the next stage.

Next, the horizontal dividing unit 32 subdivides each output of the vertical filters V1-V3 into four horizontal parts. Horizontal dividing unit 32 consists of 1H memories H11-H14 which divide the output of the vertical filter V1 into four parts, 1H memories H21-H24 which divide the output of the vertical filter V2 into four parts, and 1H memories H31-H34 which divide the output of the vertical filter V3 into four parts, and further a horizontal control circuit HC which controls the writing operation of each of the memories H11-H34.

Each of the 1H memories H11-H34 includes two pieces of 1H memory, and is constructed so that while data is written into one of the two 1H memories, data is read out of the other 1H memory.

The horizontal control circuit HC controls how the scanning line data that is input to the memories H11-H34 are assigned to the various memories, and includes a horizontal counter HC1 which counts horizontal dot signal FND, a write signal generating circuit HC2 which supplies writable signals WH1-WH4 to the memories H11-H34 based on the output of the horizontal counter HC1, and an adjusting circuit HC3 which performs delay control of the writable signals WH1-WH4.

Next, the operation of the present embodiment with the above-mentioned construction will be described.

The Hi-Vision video signal of the 35 mm film fm, which has been produced in the telecine unit 1, is converted to digital data in the A/D converting unit 2. The A/D converting unit 2 converts the Hi-Vision signal to 8 bit digital data with a clock $\phi 1$ (of 48.6 MHz, for example) and outputs the converted data to the input latch circuit D1 of the scan converter.

The input latch circuit D1 latches the input Hi-Vision signal onto the latch circuits D1a and D1b at the negative edge timing and the positive edge timing with a clock $\phi 2$, respectively (of 24.3 MHz, for example). Of the data of the first field latched onto the latch circuit D1a, a first ⅓ of the horizontal scanning line data is written in the memory M1, the next ⅓ of the horizontal scanning line data is written in the memory M2, and the last ⅓ of the horizontal scanning line data is written in the memory M3 the negative edge timing of the clock $\phi 2$. Further, the data of the same field latched onto the latch circuit D1*b* is similarly written in the memories M1-M3 at the positive edge timing of the clock $\phi 2$. In this fashion, the data of the first field is written in the memories M1-M3 having been subdivided into three vertical parts.

As described below, the scanning line converting part 31 generates one horizontal scanning line by performing arithmetic processing on seven consecutive horizontal scanning lines. Considering the case where the consecutive seven horizontal scanning lines may extend over the adjacent memories M1 and M2, the last three horizontal scanning lines to be written in the top stage memory M1 are also written in the middle stage memory M2. The same consideration applies also between the middle stage memory M2 and the bottom line memory M3, and between the bottom stage memory M3 and the top stage memory M1.

Data of a second field is written in the memories M1'-M3' similarly to the case of the first field data.

This writing operation is controlled by the vertical control circuit VC. Namely, while the vertical counter VC1, which counts the horizontal synchronizing signal fHH, is counting the signal fHH of a first ⅓ of the scanning line data, the write signal generating circuit VC2 supplies writable signal WV1 to the memories M1 and M1'. While the signal fHH of the next ⅓ of the scanning line data is counted, writable signal WV2 is supplied to the memories M2 and M2'. While the signal fHH of the last ⅓ of the scanning line data is counted, writable signal WV3 is supplied to the memories M3 and M3. Further, the writable signal WV0 supplied to the memories M1'-M3' is such that it will be at level "0" or level "1" while the signal fHH of the scanning line data of the first or the second field, respectively, is counted. The writable signal WV0 is supplied to the memories M1-M3 via an invertor IN.

In this manner, horizontal scanning line data for one frame portion of the Hi-Vision signal is stored into memories M1-M3 and M1'-M3' of the frame memory FM, having been divided into three vertical parts for each field.

Of the scanning line data stored in the frame memory FM, the scanning line data of the first field written in the top stage memory M1 is read respectively at the negative edge and the positive edge timing of a clock $\phi 3$ (of 11.3 MHz for example), and latched onto the latch circuits D2*a* and D2*b*, respectively. The data latched onto the latch circuits D2*a* and D2*b* is consolidated in a latch circuit D2*c* that is actuated by a clock $\phi 4$ (of 22.7 MHz for example) to be output to the vertical filter V1. Data of the second field stored in the top state memory M1, is similarly output to the vertical filter V1 through the latch circuit D1.

Data of the first and second fields stored in the middle stage memories M2 and M2', respectively, is output in a similar manner to the vertical filter V2 via the latch circuit D3. Further, data stored in the bottom stage memories M3 and M3' is output similarly to the vertical filter V3 via the latch circuit D4.

Each of the vertical filters V1 to V3 of the scanning line converting part 31 stores the input horizontal scanning line data in the 1H memories H1 to H7 by sequentially shifting them, and generates new scanning line data of one line using seven consecutive scanning line data. Here, if a signal output from a certain 1H memory within a certain 1H interval is called $Q_n$, and a signal output from the same memory during the next 1H interval is called $Q_{n+1}$, then the output Pi of the vertical filter can be represented by the following equations:

$$P_0 = h_{-21}Q_{-3} + h_{-14}Q_{-2} + h_{-7}Q_{-1} + h_0Q_0 + h_7Q_1 + h_{14}Q_2 + h_{21}Q_3$$
$$P_1 = h_{-19}Q_{-2} + h_{-12}Q_{-1} + h_{-5}Q_0 + h_2Q_1 + h_9Q_2 + h_{16}Q_3 + h_{23}Q_4$$
$$P_2 = h_{-24}Q_{-2} + h_{-17}Q_{-1} + h_{-10}Q_0 + h_{-3}Q_1 + h_4Q_2 + h_{11}Q_3 + h_{18}Q_4$$
$$P_3 = h_{-22}Q_{-1} + h_{-15}Q_0 + h_{-8}Q_1 + h_{-1}Q_2 + h_6Q_3 + h_{13}Q_4 + h_{20}Q_5$$
$$P_4 = h_{-20}Q_0 + h_{-13}Q_1 + h_{-6}Q_2 + h_1Q_3 + h_8Q_4 + h_{15}Q_5 + h_{22}Q_6$$
$$P_5 = h_{-18}Q_1 + h_{-11}Q_2 + h_{-4}Q_3 + h_3Q_4 + h_{10}Q_5 + h_{17}Q_6 + h_{24}Q_7$$
$$P_6 = h_{-23}Q_1 + h_{-16}Q_2 + h_{-9}Q_3 + h_{-2}Q_4 + h_5Q_5 + h_{12}Q_6 + h_{19}Q_7$$
$$P_7 = (P_0) = h_{-21}Q_2 + h_{-14}Q_3 + h_{-7}Q_4 + h_0Q_5 + h_7Q_6 + h_{14}Q_7 + h_{21}Q_8$$

In the above equations, $h_n$ is an impulse response of the filter which satisfies the relation $h_n = h_{-n}$.

In this way, one line of new horizontal scanning line data Pi is generated by summing the results of multiplying lines of consecutive scanning line data, written in the 1H memories H1-H7, by predetermined coefficients.

Figure 7:
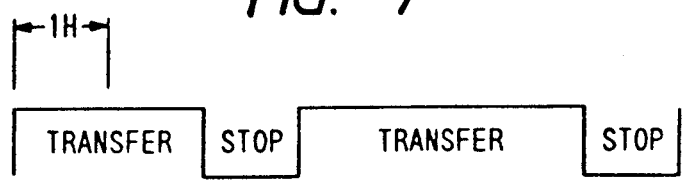
FIG. 7 is a timing chart explaining the operation of the vertical filter of FIG. 6.
Figure 8:
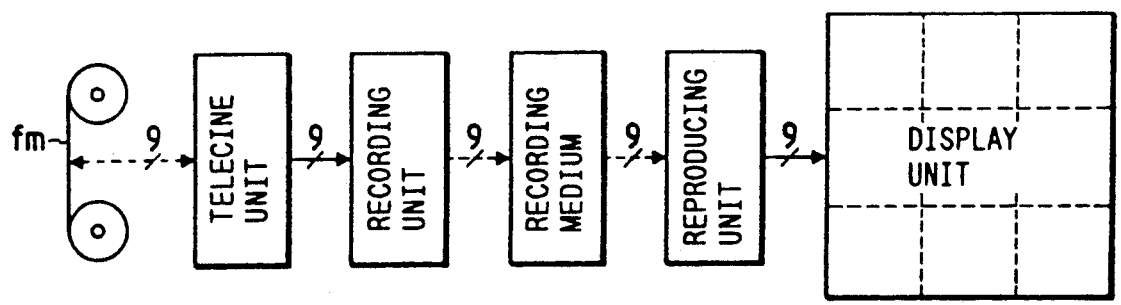
FIG. 8 is a block diagram showing the conventional image display system.

The scanning line number converting operation in the ratio of 5 to 7 is performed in the vertical filter V1 by repeating the operation shown in the timing chart of FIG. 7 in each of the memories H1-H7. Specifically, the operation involves transferring the data for the initial 2H interval, stopping the transfer of the data for the next 1H interval, transferring the data again for the next 3H interval, and stopping the transfer of the data for the next 1H interval. In this case, the coefficients in the respective coefficients circuits K1-K7 are changed for every 1H interval, and the output is produced for every 1H interval. Therefore, seven horizontal scanning lines are generated by five transfers, namely seven horizontal scanning lines are generated out of five original horizontal scanning lines.

The scanning line data which has been converted in the ratio of 5 to 7 in the vertical filters V1 to V3 is supplied to the horizontal dividing part 32 where it is subdivided into four parts under the control of : the horizontal control circuit HC. Namely, the output of the vertical filter V1 is stored in the 1H memories H11-H14, the output of the vertical filter V2 is stored in the 1H memories H21-H24, and the output of the vertical filter V3 is stored in the 1H memories H31-H34 according to the timing of the clock $\phi 4$.

This writing operation to the 1H memories H11-H34, is controlled by the horizontal control circuit HC. Namely, in the horizontal control circuit HC, the writable signal WH1 is supplied from the write signal generating circuit HC2 to the memories H11, H21 and H31 while the horizontal counter HCI is counting the horizontal dot signal fND in an initial horizontal ¼ interval. The rewritable signal WH2 is supplied to the memories H12, H22 and H32 while the counter is counting the signal fND in the next ¼ interval, the rewritable signal WH3 is supplied to the memories H13, H23 and H33 while the counter is counting the signal fND in the following ¼ interval, the rewriting signal WH4 is supplied to the memories H14, H24 and H34 while the counter is counting the signal fND in the last ¼ interval.

Further, each of the 1H memories H11–H34 has two pieces of 1H memory, and repeats alternately the operation of writing data in one of the two 1H memories according to the timing of the clock $\phi 4$ while the data is being read out from the other 1H memory according to the timing of $\phi 5$ (of 5.67 MHz, for example).

Twelve sets of horizontal scanning line data for one image is obtained, as described, by dividing the original image into three vertical parts and four horizontal parts in the scan converter 3 are subsequently converted respectively to NTSC signals in the D/A converters DA11–DA34 of the D/A converting unit 5, and are supplied to the recording devices RC11–RC34 which constitute the recording unit 6. In the recording units RC11–RC34, the respective NTSC signals are recorded in the corresponding video disks VD11–VD34.

The NTSC signals recorded in the twelve video disks VD11–VD34 are reproduced simultaneously in the twelve sets of video disk players PL11–PL34, and are displayed simultaneously on a display unit 7 consisting of twelve NTSC system receivers.

Now, when an image of a 35 mm film is converted to a Hi-Vision signal, since the aspect ratio of the 35 mm film is about 4:3 (1.33:1 to be exact) while that of the Hi-Vision signal is 16:9, spaces may appear in the left and right end portions of the screen as shown in FIG. 2(a). This image may be recorded in twelve disks and reproduced on twelve sets of the NTSC system receivers. If so, however, available recording area is wasted since only one half of the recording area is used to record the video signals in the disks VD11–VD31 and VD14–VD34, which correspond to the left and right screen portions.

Further, as shown in FIG. 3(a), when an image occurs which would cause vacant portions in the top and bottom of the screen, similar waste of recording area occurs, since only one half the recording area is used to record the video signal in the disks VD11–VD14 and VD31–VD34.

In the present invention, taking the above considerations into consideration, when an image with an aspect ratio smaller or larger than 16:9 is converted, the picture position is shifted with respect to the screen, leftward by means of the horizontal control circuit HC or upward by means of the vertical control circuit VC, respectively.

That is, when obtaining the display situation shown in FIG. 2(b) by shifting a picture image in the horizontal direction by one half the horizontal length of the divided screen, the writable signals WH1–WH4 are delayed by a predetermined time in the adjusting circuit HC3 of the horizontal control circuit HC, thereby delaying the timing at which the scanning line data is written in the 1H memories H11–H34.

Further, when obtaining the display situation shown in FIG. 3(b) by shifting a picture image in the vertical direction by one half the vertical width of the divided screen, the writable signals WV0–WV3 are delayed by a predetermined time in the adjusting circuit VC3 of the vertical control circuit VC, thereby delaying the timings at which the scanning line data is written in the frame memory FM.

With the above arrangement, the screens #14–#34 on the rightmost end of the entire screen in FIG. 2(b) and the bottom screens #31–#34 in FIG. 3(b) become unnecessary. Consequently, recording devices, video disks, reproducing devices, NTSC system receivers and the like corresponding to the unnecessary screens are no longer needed, enabling a reduction in the system cost.

It should be noted that although the present invention has been illustrated in conjunction with the case of converting a Hi-Vision signal to NTSC signals, the present invention can also be applied to the case, for example, of converting a signal in the HD-MAC system to the signals in the PAL system or the SECAM system.

In accordance with the present invention, in displaying an image by subdividing it into a plurality of images, and displaying them on a plurality of display devices, an image is temporarily converted to be displayed as a high definition television signal. Then, the converted signal is further converted into a plurality of television signals compatible with television systems currently in use. Therefore, by performing the subdivision of the high definition television signal by purely electronic techniques, mismatching that could occur between the screens thus divided is prevented.

Moreover, when the aspect ratio of the image to be displayed has a smaller or larger value than the aspect ratio of the high definition television system, the image is displayed by shifting its position in the horizontal or the vertical direction, respectively. Then, various kinds of devices, such as display devices that correspond to screens not used after the shifting become unnecessary, which makes it possible to achieve a reduction in system costs.

What is claimed is:

1. An image display system for displaying an image on a screen comprising a plurality of standard television system receivers, comprising:

means for inputting an input image having a certain aspect ratio;

means for converting said input image into a high definition television system video signal;

means for converting said high definition television system video signal into a plurality of standard television system video signals;

means for displaying said plurality of standard television system video signals on a plurality of standard television system receivers; and means for shifting a position of said plurality of standard television system video signals displayed on said plurality of standard television system receivers in a horizontal direction when an aspect ratio of said input image is smaller than an aspect ratio of the high definition television system and a vertical direction when an aspect ratio of said input image is larger than an aspect ratio of the high definition television system.

2. An image display system as claimed in claim 1, wherein said means for converting said input image into a high definition television system video signal comprises a telecine unit.

3. An image display system as claimed in claim 1, wherein said means for converting said high definition television system video signal into a plurality of standard television system video signals comprises:

A/D (analog-to-digital) converting means to convert said high definition television system video signal into a digital signal; and scan converter means for subdividing said digital data into three vertical and four horizontal parts for each frame of said digital data to generate twelve groups of scanning line data for each of said frames.

4. An image display system comprising:

means for inputting an input image of a 35 mm film;

a telecine unit for converting said input image into a high definition television system video signal;

A/D (analog-to-digital) converting means for converting said high definition television system video signal into a digital signal representing said high definition television system video signal;

scan converter means for subdividing said digital signal representing said high definition television video signal system into three vertical and four horizontal parts for each frame of said digital signal to generate twelve groups of scanning line data for each of said frames;

D/A (digital-to-analog) converting means for converting said twelve groups of scanning line data into standard television system video signals;

recording means for recording said converted twelve groups of standard television system video signals in a recording media;

reproducing means for reproducing said twelve groups of standard television system video signals;

display means for displaying said twelve groups of standard television system video signals, and means for shifting a position of said twelve groups of standard television system video signals displayed on said display means in a horizontal direction when an aspect ratio of said input image is smaller than an aspect ratio of the high definition television system and a vertical direction when an aspect ratio of said input image is larger than an aspect ratio of the high definition television system.

5. An image display system as claimed in claim 4, wherein said scan converting means comprises:

vertical dividing means for subdividing and storing said digital signal representing said high definition television system video signal into three vertical portions for each frame;

scanning line converting means for converting five horizontal scanning lines of said digital signal representing said high definition television system video signal into seven horizontal scanning lines; and horizontal dividing means for subdividing each of said converted scanning lines into four horizontal parts.

6. An image display system as claimed in claim 5, wherein said vertical dividing means comprises:

input latch means for latching said digital signal representing said high definition television system video signal;

frame memory means connected to said input latch means for subdividing horizontal scanning line data of said digital signal representing said high definition television system video signal into three vertical parts for each frame and for storing said three vertical parts for each frame in memory devices;

output latch means connected to said frame memory means for consolidating said horizontal scanning line data for each of said three vertical parts; and vertical control circuit means connected to said frame memory means for controlling a storage operation of said frame memory means.

7. An image display system as claimed in claim 6, wherein said input latch means comprises:

a first latch circuit for latching said digital signal representing said high definition television system video signal at a negative edge of an externally generated clock signal; and a second latch circuit connected in parallel to said first latch circuit for latching said digital signal representing said high definition television system video signal at a positive edge of said clock signal.

8. An image display system as claimed in claim 6, wherein said memory devices comprise first and second sets of memory devices, each of said sets containing three memory units.

9. An image display system as claimed in claim 8, wherein said output latch means comprises:

a first latch circuit for latching outputs of said first set of memory devices;

a second latch circuit for latching outputs of said second set of memory devices; and a third latch circuit for combining outputs of said first and second latch circuits.

10. An image display system as claimed in claim 6, wherein said vertical control circuit means comprise:

a vertical counter for counting horizontal synchronizing signals;

a write signal generating circuit connected to said vertical counter for supplying write signals to said frame memory means based on an output of said vertical counter; and adjusting circuit means connected to said write signal generating circuit for performing delaying control of said write signals.

11. An image display system as claimed in claim 5, wherein said scanning line converting means comprises three vertical filters.

12. An image display system as claimed in claim 11, wherein each of said three vertical filters comprises:

a plurality of memory units connected in series for delaying data input to said vertical filters;

a first plurality of latch circuits respectively connected to outputs of said plurality of memory units for latching said outputs;

a plurality of coefficient circuits respectively connected to outputs of said first plurality of latch circuits for multiplying said outputs of said first plurality of latch circuits by coefficients;

a second plurality of latch circuits for respectively latching outputs of said coefficient circuits; and adder circuits for summing outputs of said second plurality of latch circuits.

13. An image display system as claimed in claim 5, wherein said horizontal dividing unit comprises:

a plurality of memory devices for dividing outputs of said scanning line converting means into four horizontal parts.

14. An image display system as claimed in claim 13, wherein said horizontal dividing unit further comprises a horizontal control circuit connected to said plurality of memory devices.

15. An image display system as claimed in claim 14, wherein said horizontal dividing unit comprises:

a horizontal converter for counting horizontal dot signals;

a write signal generating circuit connected to said horizontal counter for supplying write signals to said plurality of memory devices based on an output of said horizontal counter; and an adjusting circuit connected to said write signal generating circuit for performing delay control of said write signals.

16. An method of displaying an image on a screen comprising a plurality of standard television system receivers, comprising:

inputting an input image having a certain aspect ratio;

converting said input image into a high definition television system video signal;

converting said high definition television system video signal into a plurality of standard television system video signals;

displaying said plurality of standard television system video signals on a plurality of standard television system receivers; and shifting a position of said plurality of standard television system video signals displayed on said plurality of standard television system receivers in a horizontal direction when an aspect ratio of said input image is smaller than an aspect ratio of the high definition television system and a vertical direction when an aspect ratio of said input image is larger than an aspect ratio of the high definition television system.

17. An image display method comprising:

inputting an input image of a 35 mm film;

converting said input image into a high definition television system video signal in a telecine unit;

converting said high definition television system video signal into a digital signal representing said high definition television system video signal by an A/D (analog-to-digital) converter;

subdividing said digital signal representing said high definition television video signal into three vertical and four horizontal parts for each frame of said digital signal to generate twelve groups of scanning line data for each of said frames;

converting said twelve groups of scanning line data into standard television system video signals by a D/A (digital-to-analog) converter;

recording said converted twelve groups of standard television system video signals in a recording media;

reproducing said twelve groups of standard television system video signals;

displaying said twelve groups of standard television system video signals; and shifting a position of said twelve groups of standard television system video signals displayed on said display means in a horizontal direction when an aspect ratio of said input image is smaller than an aspect ratio of the high definition television system and a vertical direction when an aspect ratio of said input image is larger than an aspect ratio of the high definition television system.

* * * * *